Patented July 12, 1949

2,476,264

UNITED STATES PATENT OFFICE 2,476,264

ARALIPHATIC NITRILES

Warren D. Niederhauser, Philadelphia, Pa., assignor to Rohm & Haas Company, Philadelphia, Pa., a corporation of Delaware No Drawing. Application January 18, 1947, Serial No. 722,965

7 Claims. (Cl. 260—465)

This invention relates to nitriles having the general formula Ar—R—CN in which Ar represents an aromatic hydrocarbon radical and the character R represents a saturated, alkylene group containing 10 to 21 carbon atoms. The —CN group is, of course, a cyanide or nitrile group.

In the preferred process of making the compounds of this invention, a long-chain alkenyl nitrile, that is, an unsubstituted nitrile containing one double bond, is first made by reacting ammonia with the corresponding mono-unsaturated acid or ester in the presence of a dehydrating agent. This unsaturated nitrile is then combined, by a Friedel-Crafts reaction in the presence of aluminum chloride, with an aromatic hydrocarbon. Under the conditions of this reaction, the aromatic hydrocarbon reacts at the double bond of the alkenyl nitrile and a nuclear hydrogen atom of the aromatic hydrocarbon adds to one of the two carbon atoms joined by the double bond while the hydrocarbon radical adds to the other. The reaction mixture is then freed of aluminum compounds by hydrolysis, and a product is obtained which has the general formula shown above.

By another method, the products of this invention are made by first reacting, by a Friedel-Crafts reaction in the presence of aluminum chloride, an aromatic hydrocarbon and an aliphatic acid containing one double bond, or a lower alkyl ester thereof, to form an addition compound which is thereafter reacted with ammonia in the presence of a catalyst to yield the desired nitrile.

In either of the above processes it is imperative that the temperature during the Friedel-Crafts reaction be below 90° C., and preferably below 85° C. At temperatures above 90° C., side reactions, including polymerization of the unsaturated compounds, take place.

In the general formula, Ar—R—CN, for the products of this invention, the character Ar represents a monovalent, aromatic hydrocarbon radical which contains only carbon and hydrogen and is, therefore, unsubstituted. Typical of such radicals are the following: Phenyl, tolyl, xylyl, naphthyl, biphenyl, dibenzyl, benzyl phenyl, ethyl phenyl, isopropyl phenyl, trimethyl phenyl, di-isopropyl phenyl, tert.-amyl phenyl, alpha- and beta-methyl naphthyl and the like. While Ar may represent any unsubstituted aromatic hydrocarbon radical, those nitriles are the most useful and valuable in which Ar represents a hydrocarbon radical of 6 to 14 carbon atoms. Nitriles containing such a hydrocarbon radical have a balance of physical properties, such as high boiling point, compatibility, water-resistance, which make them particularly useful as plasticizers for thermoplastic materials, such as polyvinyl esters, acetals and halides and cellulosic esters and ethers. Compounds in which Ar represents phenyl, naphthyl, biphenyl, tolyl, xylyl are by far the most valuable and useful.

The aromatic hydrocarbon group containing 6 to 14 carbon atoms and represented by Ar is joined through a nuclear carbon atom to an alkylene group of 10 to 21 carbon atoms represented by R which is in turn joined to the —CN or nitrile group. This alkylene, or divalent group, R, is free of unsaturation, contains only carbon and hydrogen and is, therefore, unsubstituted. It may be represented by the conventional formula —$(C_nH_{2n})$—, and the carbons thereof may be in straight or branched arrangements.

Vegetable and fish oils serve as excellent sources of the mono-unsaturated acids and esters which are converted to the nitriles of this invention and which furnish the alkylene portion, R, thereof. Also mono-unsaturated acids of the required number of carbon atoms may be synthesized by conventional means. Such acids which may be employed include the following and the isomers thereof: $\Delta^{10}$-undecenoic, $\Delta^{11}$-dodecenoic, $\Delta^{12}$-tridecenoic, myristoleic, palmitolenic, oleic, elaidic, iso-oleic, $\Delta^{11}$-octadecenoic, $\Delta^{12}$-octadecenoic, erucic, cetoleic, and brassidic acids. These acids give reaction products of the formula

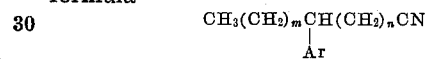

wherein Ar represents an aromatic hydrocarbon radical and $m$ and $n$ represent integers whose sum is from 8 to 19 and $n$ alone is from 7 to 12.

The following examples serve to illustrate how the products of this invention may be made.

*Example 1*

Into a three-neck flask, equipped with thermometer, agitator and reflux condenser, was charged 230 grams of toluene and 74 grams of aluminum chloride. Agitation was begun and 131.5 grams of oleonitrile was added over a period of 25 minutes. The heat of reaction caused a rise in temperature of the mixture to 70° C., and the mixture was maintained at 70° C. for a period of one hour, after which it was cooled to 30° C. At this point the contents of the flask were poured into a mixture of 250 grams of ice and 250 grams of water and the resultant mixture was stirred for ten minutes. The supernatant oil was separated and was washed three times with hot water. Unreacted toluene was removed by distillation at atmospheric pressure after which the residue was distilled under reduced pressure. A yield of 125 grams of tolyl stearonitrile was obtained (B. P. 195°–200° C. at 0.6 mm. $N_D^{27.5}$ 1.4869, $d_4^{25}$ 0.895).

(Analysis: 4.06% $N_2$; 11.22% $H_2$ and 84.02% C; calculated value: 3.94% $N_2$; 11.62% $H_2$ and 84.45% C.)

Example 2

Following the general procedure described in Example 1, a mixture of 468 grams of benzene and 148 grams of aluminum chloride was stirred and maintained at 70°–80° C. during the addition thereto of 263 grams of oleonitrile over a period of 30 minutes. The reaction mixture was heated for two hours at 80°–85° C. and then cooled to 30° C. It was poured over a mixture of 1000 grams of ice and 150 grams of 30% hydrochloric acid and was stirred for an hour. The oily layer which separated was removed, washed with warm water several times and distilled under reduced pressure. The yield was 176 grams of phenyl stearonitrile (B. P. 200°–205° C. at 2 mm.).

Example 3

A mixture of 530 grams of xylene, 148 grams of aluminum chloride, and 300 ml. of carbon disulfide was stirred under reflux at 55°–65° C. while 263 grams of oleonitrile was added thereto over a period of 40 minutes. This mixture was then stirred and heated at 60°–65° C. for four hours. The catalyst was separated by pouring the mixture into ice-water, after which the water-immiscible layer was washed several times with water and distilled under vacuum to yield 257 grams of xylyl stearonitrile (B. P. 220°–230° C. at 1 mm. $N_D^{22.4}$ 1.4957).

Example 4

A mixture of 600 grams of trimethyl benzene, 148 grams of aluminum chloride, and 300 ml. of carbon disulfide was stirred at 50°–55° C. under reflux while 263 grams of oleonitrile was added thereto over a period of 40 minutes. After this mixture had been heated at 60° C. for four hours, it was poured into ice-water. The oily layer which separated was then removed, washed with water and distilled under vacuum to yield 284 grams of trimethyl phenyl stearonitrile, (B. P. 230°–235° C. at 1 mm. Analysis: $N_2$=3.58).

Example 5

A mixture of 480 grams of isopropyl benzene, 200 ml. of carbon disulfide, and 146 grams of aluminum chloride was stirred and cooled in an ice-bath while 263 grams of oleonitrile was added dropwise. The mixture was held at room temperature for 15 hours and was then stirred and heated under reflux for one hour at 60°–65° C., after which it was poured into ice-water. The oily layer which separated was washed with water and distilled under vacuum. A yield of 219.5 grams of isopropyl phenyl stearonitrile was obtained.

Example 6

A mixture of 768 grams of naphthalene, 148 grams of aluminum chloride and 500 ml. of carbon disulfide was stirred and cooled in an ice-bath while 263 grams of oleonitrile was added dropwise thereto. The mixture was then stirred and heated to 65° C., at which temperature it was maintained under reflux for four hours. The mixture was then added to 1000 grams of ice-water. Four hundred cc. of toluene was added to dissolve the organic portion of the mixture and the resultant solution was washed with water. The toluene was removed by distillation and the product was then distilled under vacuum. A 51% yield of naphthyl stearonitrile was obtained, (B. P. 240°–245° C. at 2 mm. $N_D^{22.5}$ 1.5340).

Example 7

A mixture of 924 grams of diphenyl, 500 ml. of carbon disulfide, and 148 grams of aluminum chloride was stirred and cooled in an ice-bath while 263 grams of oleonitrile was added thereto over a period of eight minutes. The mixture was stirred one hour at room temperature and three hours at 65° C. under reflux. The product was quenched in ice-water, extracted with toluene, washed with water, and distilled to remove toluene. The residue was distilled under vacuum and gave a 51% yield of crude diphenyl stearonitrile which was then redistilled at 258°–265° C. and 2 mm. pressure.

Example 8

To a stirred mixture of 460 grams of toulene and 147 grams of aluminum chloride was added over a period of 20 minutes 282.3 grams of oleic acid. The temperature rose due to the exothermic reaction and was held at 80° C. for ten minutes after all of the oleic acid had been added. The reaction mixture was poured into a mixture of 1000 grams of ice and 150 grams of 30% hydrochloric acid, after which the oily layer was washed with water and dried. Toluene was removed by distillation at atmospheric pressure after which the residue was distilled under vacuum. A total of 188.5 grams of the product, tolyl stearic acid, and 7.52 grams of ammonium molybdate was stirred and heated at 265° C. for seven hours while dry ammonia was passed thereinto. At the end of this time the acid number of the mixture was 1.1 and no water was being evolved. The product was distilled at 213°–218° C. and 1 mm. pressure. A total of 156 grams of tolyl stearonitrile was obtained.

(Analysis: 4.09% $N_2$; 11.3% $H_2$ and 84.07% C.)

Example 9

A mixture of 2.5 g. of activated alumina and 252.9 g. of distilled methyl ester of xylyl stearic acid, prepared by reacting methyl oleate and xylene in the presence of aluminum chloride by the procedure described in Example 8, was heated nine hours at 300°–305° C. while ammonia was passed through the stirred mixture. The product was distilled under reduced pressure and a good yield of xylyl stearonitrile was obtained.

Example 10

To a stirred mixture of 134.4 grams of toluene and 49.9 grams of aluminum chloride there was added dropwise over a period of 30 minutes 48.3 grams of undecylenonitrile. During this addition the temperature rose to 70° C., at which point the reaction mixture was held and stirred for one hour. The mixture was then mixed with 300 grams of ice and 30 cc. of 12 N hydrochloric acid. The oily layer which was separated was washed with water, dried, and distilled. The product, tolyl undecanonitrile, was a colorless oil which boiled at 185°–190° C. at 2 mm. pressure and had a refractive index of $n_D^{25}$ 1.4973.

Example 11

To a stirred mixture of 62 grams of toluene and 14 grams of aluminum chloride, there was added 32.4 grams of eruconitrile ($\Delta^{13}$-docosenonitrile) over a period of ten minutes during which time the temperature rose to 60° C. The temperature was raised to 70° C. and the mixture was held at this point for one hour after which it was poured over a mixure of ice and hydrochloric acid, as in the above examples. The oil-layer was washed, dried and distilled as described above and yielded 25.8 grams of tolyl behenonitrile which boiled under 2 mm. pressure at 260°–270° C.

*Example 12*

To a stirred mixture of 710 grams of methyl naphthalene and 148 grams of aluminum chloride there was added 263 grams of oleonitrile over a period of 30 minutes, while the temperature was maintained between 30° and 50° C. by means of external cooling. The mixture was then held at 50° C. for one hour after which it was quenched in ice-water and the oil-layer was washed, dried and distilled in the manner described above. The product, 166 grams of crude methylnaphthyl stearonitrile was redistilled and boiled at 250°–255° C. at 1 mm. pressure.

The nitriles of this invention are particularly valuable as plasticizers for thermoplastic materials such as nitrocellulose, cellulose acetate, cellulose propionate, cellulose butyrate, ethyl and benzyl cellulose, polyvinyl chloride, polyvinyl acetate and copolymers of the chloride and acetate, polyvinyl acetals such as polyvinyl formal and polyvinyl butyral, and the like. When employed as plasticizers, the nitriles are very stable and permanent. They do not evaporate or spew from compositions of which they are a part and they have exceptional resistance to heat, ultraviolet light and to moisture.

The use of two nitriles as plasticizers for polyvinyl chloride is illustrated in the following example:

*Example 13*

In this example three polyvinyl chloride compositions were made for comparative purposes. The three compositions differed only in the particular plasticizer employed. All of the compositions had the following ingredients:

| | Parts |
|---|---|
| Polyvinyl chloride | 140 |
| Plasticizer | 70 |
| Basic lead carbonate | 2 |
| Stearic acid | 1 |

The compositions were made individually by milling the ingredients under identical conditions on a rubber mill. The three plasticizers were respectively tolyl stearonitrile, dioctyl phthalate and biphenyl stearonitrile. The following results were obtained on testing the three compositions.

| | Comp. cont. Tolyl Stearonitrile | Comp. cont. Dioctyl Phthalate | Comp. cont. Biphenyl Stearonitrile |
|---|---|---|---|
| Young's Modulus | 1060 | 1040 | 1235. |
| Bend Brittle Temp. (ASTM test D746-44T). | –46° C | –29° C | –21° C. |
| Volatility (48 Hr. at 85° C.). | 0.52% | 1.2% | 0.24%. |
| Ultraviolet Resistance | Excellent | Poor | Good. |
| Heat Resistance (Hours at 150° C. before stock darkens). | Over 9 | 3–4 | 8–9. |

I claim:
1. A product consisting of the mixture of isomers of a nitrile having the general formula

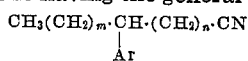

in which Ar represents an aromatic hydrocarbon radical and m and n represent integers such that their sum is 8 to 19 and n has a value of 7 to 12, as prepared by reacting under the influence of heat at a temperature up to 90° C. and in the presence of a Friedel-Crafts catalyst (a) an aromatic hydrocarbon and (b) an alkenyl nitrile which contains 11 to 22 carbon atoms and has its double bond removed from its cyano group by 7 to 12 carbon atoms.

2. A product consisting of the mixture of isomers of a nitrile having the general formula

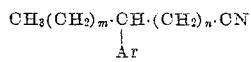

in which Ar represents an aromatic hydrocarbon radical containing 6 to 14 carbon atoms and m and n represent integers such that their sum is 8 to 19 and n has a value of 7 to 12, as prepared by reacting under the influence of heat at a temperature up to 90° C. and in the presence of a Friedel-Crafts catalyst (a) an aromatic hydrocarbon and (b) an alkenyl nitrile which contains 11 to 22 carbon atoms and has its double bond removed from its cyano group by 7 to 12 carbon atoms.

3. A product consisting of the mixture of isomers of a nitrile having the general formula

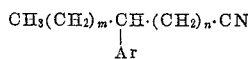

in which Ar represents an aromatic hydrocarbon radical containing 6 to 14 carbon atoms and m and n represent integers such that their sum is 15 and n has a value of 7 to 11, as prepared by reacting under the influence of heat at a temperature up to 90° C. and in the presence of a Friedel-Crafts catalyst (a) an aromatic hydrocarbon and (b) an alkenyl nitrile which contains 18 carbon atoms and has its double bond removed from its cyano group by 7 to 11 carbon atoms.

4. A product consisting of the mixture of isomers of a nitrile having the general formula

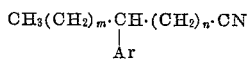

in which Ar represents an aromatic hydrocarbon radical containing 6 to 14 carbon atoms and m and n represent integers such that their sum is 15 and n has a value of 7 to 8 inclusive, as prepared by reacting under the influence of heat at a temperature up to 85° C. and in the presence of a Friedel-Crafts catalyst (a) an aromatic hydrocarbon containing 6 to 14 carbon atoms and (b) oleonitrile.

5. A product consisting of a mixture of 9-tolylstearonitrile and 10-tolylstearonitrile.

6. A product consisting of a mixture of 9-naphthylstearonitrile and 10-naphthylstearonitrile.

7. A product consisting of a mixture of 9-biphenylstearonitrile and 10-biphenylstearonitrile.

WARREN D. NIEDERHAUSER.

REFERENCES CITED

The following references are of record in the file of this patent:

UNITED STATES PATENTS

| Number | Name | Date |
|---|---|---|
| 2,175,092 | Ralston | Oct. 3, 1939 |

OTHER REFERENCES

Rossolymo, Ber. Deut. Chem., vol. 22, pages 1236–1238 (1889).

Bodroux et al., Compt. rend. (Fr. Acad. Sci.), vol. 150, page 1243 (1910) (Copies in Scientific Library).